United States Patent [19]
Sidwell

[11] Patent Number: 6,120,553
[45] Date of Patent: Sep. 19, 2000

[54] SYSTEM FOR MODIFYING JCL STATEMENTS TO OPTIMIZE DATA STORAGE ALLOCATIONS

[76] Inventor: Leland P. Sidwell, 10107 Bronco Dr., Parker, Colo. 80134

[21] Appl. No.: 08/993,644

[22] Filed: Dec. 18, 1997

[51] Int. Cl.⁷ ............................................. G06F 9/45
[52] U.S. Cl. ...................... 717/9; 717/2; 717/3; 717/8
[58] Field of Search ...................... 395/709; 717/9, 717/2, 3, 4, 8; 358/1.16; 707/1, 205; 710/5; 711/129, 220

[56] References Cited

U.S. PATENT DOCUMENTS

| | | | |
|---|---|---|---|
| 4,926,349 | 5/1990 | Thor | 345/334 |
| 5,018,060 | 5/1991 | Gelb et al. | 707/205 |
| 5,412,801 | 5/1995 | De Remer et al. | 714/20 |
| 5,438,674 | 8/1995 | Keele et al. | 395/404 |
| 5,506,986 | 4/1996 | Healy | 395/600 |
| 5,778,350 | 7/1998 | Adams et al. | 707/1 |
| 5,790,886 | 8/1998 | Allen | 710/5 |
| 5,812,843 | 9/1998 | Yamazaki et al. | 395/670 |
| 5,875,464 | 2/1999 | Kirk | 711/129 |
| 5,951,658 | 9/1999 | Eickemeyer et al. | 711/220 |
| 5,987,230 | 11/1999 | Shimizu | 358/1.16 |
| 6,052,202 | 4/2000 | Shimizu | 358/1.16 |

FOREIGN PATENT DOCUMENTS

| | | | |
|---|---|---|---|
| 5298120 | 4/1992 | Japan | G06F 9/46 |
| 5-94282 | 4/1993 | Japan | G06F 9/06 |
| 5094282 | 4/1993 | Japan | G06F 9/06 |
| 05298120 | 11/1993 | Japan | G06F 9/46 |

OTHER PUBLICATIONS

Europe eyes world supercomputer markets, NTIS Foreign Technology Newsletter, vol. 90, No. 39, Sep. 1990.

Sterling Software Delivers SAMS: VANTAGE 3.1, PR Newswire, pp. 0229SFTH014, Feb. 1996.

IBM Corporation, Memory Management Mechanism to Reduce Cache–line Contention, IBM Technical Disclosure Bulletin, vol. 32, No. 8B, Jan. 1990.

Katsuyoshi, Automatic JCL Generating System, Abstract of Japanese Patent No. JP4260124A2, Sep. 1992.

Noriko, Program History Control System, Abstract of Japanese Patent No. JP63244135A2, Oct. 1988.

Hiroshi, Expert System for Generating Job Control Language, Abstract of Japanese Patent No. JP63012026A2, Sep. 1990.

MacIver, A Logical Use of Disks, IBM System User, p. 12(4), Jul. 1990.

*Primary Examiner*—Tariq R. Hafiz
*Assistant Examiner*—Hoang-Vu Antony Nguyen-Ba
*Attorney, Agent, or Firm*—Dorr, Carson, Sloan & Birney, P.C.

[57] ABSTRACT

A system for modifying job control language (JCL) statements optimizes data storage allocations for datasets by collecting historical data concerning actual data storage space requirements and use patterns for each dataset. JCL statements are parsed to find references to datasets and their requested data storage space allocations. The system then generates revised JCL statements with revised space allocation requests and dataset migration information for each dataset based on historical space requirements and usage patterns. Optionally, the system can display each proposed change to the JCL statements for approval by the user. The system can also revise JCL statements requesting allocation of space for each dataset in predetermined data storage areas grouped by predetermined size ranges.

20 Claims, 5 Drawing Sheets

```
//CITEXTFL  DD  DSN=CAP.CAD0400.CITEVERP.PASS(+1),CSIP=&DISP3,
            UNIT=SYSDA,SPACE=(CYL,(10,10),RLSE),
            DCB=(GDG,RECFM=FB,LRECL=104,BLKSIZE=27976)
```

Fig. 3(a)

```
//CITEXTFL  DD  DSN=CAP.CAD0400.CITEVERP.PASS(+1),CSIP=&DISP3,
            UNIT=SYSDA,
            DCB=(GDG,RECFM=FB,LRECL=104,BLKSIZE=27976),
            DATACLAS=DC0102ZZ,STORCLAS=DC0200,
            MGMTCLAS=MSS0IZ
```

Fig. 3(b)

```
//SORTOUT  DD  DSN=CAP.CAD0400.SRTERROT.LIBR(+1),CSIP=&DISP3,
               UNIT=TAPE,VOL=(,RETAIN),LABEL=EXPDT=98007,
               DCB=(GDG,RECFM=FB,LRECL=152,BLKSIZE=32680,TRTCH=COMP)
```

Fig. 4(a)

```
//SORTOUT  DD  DSN=CAP.CAD0400.SRTERROT.LIBR(+1),CSIP=&DISP3,
               UNIT=TAPE,VOL=(,RETAIN),LABEL=EXPDT=98007,
               DCB=(GDG,RECFM=FB,LRECL=152,BLKSIZE=32680,TRTCH=COMP),
               DATACLAS=DC2227ZZ,STORCLAS=TD2700,
               MGMTCLAS=MSS0IZ
```

Fig. 4(b)

| Option | SPACE | DATACLAS | STORCLAS | MGMTCLAS | AVGREC | File Type |
|---|---|---|---|---|---|---|
| Group | D, R | A | A, D, X | X | A, D | permanent disk data set |
| Pool | D | A | A, D, X | X | D | permanent disk data set |
| Dataclass | D | A | A, D, X | X | D | permanent disk data set |
| Mgmtclass | X | X | X | A | X | permanent disk and tape data sets |
| Tape to Disk | A | A | A | X | A | permanent tape data set |
| Temp Datasets | D | A | A, D, X | X | D | temporary disk data set |
| Space Recalc. | R | X | X | X | | permanent and temporary disk data sets |
| Replace Storageclass | | | | | | permanent disk and tape data sets |
| Remove Sortwk | D | D | D | D | D | temporary disk data set |

Legend:
 A - Add the parameter and a value (if the parameter already exists, its value is replaced with the generated value
 R - Recalculate the SPACE parameter
 D - Delete the parameter
 X - No action. Place the unchanged parameter in the new statement.

Fig. 5

SYSTEM FOR MODIFYING JCL STATEMENTS TO OPTIMIZE DATA STORAGE ALLOCATIONS

BACKGROUND OF THE INVENTION

1. Field of the Invention

The present invention relates generally to the field of systems for optimizing data storage in computers. More specifically, the present invention discloses a system for modifying JCL statements to optimize data storage allocations based on historical space requirements for each dataset.

2. Statement of the Problem

Many mainframe computers used in business environments run batch jobs controlled by job control language (JCL) statements. The JCL statements provide instructions to the computer operating system specifying each program to be executed and the defining the datasets that will be used by the program. A JCL statement typically defines a dataset in terms of its name, physical data storage device, size, and other parameters required by the operating system.

It is common practice for a set of JCL statements to be written at the time a new application is first installed. The requested data storage allocations and other parameters for each dataset are based on the estimated needs of the job, before information on the actual data requirements of the job is available. Programmers writing JCL statements tend to err on the side of requesting too much space for each dataset to prevent errors during job execution. This can result in JCL statements that request space allocations that are several times larger than the actual space requirements for datasets.

After initial installation, batch jobs are typically run on a periodic basis according to the needs of the particular business (e.g., to generate invoices or paychecks). The JCL statements initially created for a job are often reused without change whenever the job is run due to the difficulty of writing and debugging JCL statements. As a result, JCL statements containing inflated or inaccurate data storage allocation requests continue to be used indefinitely, even after the application has been run for many years.

The prior art includes systems that monitor actual data storage requirements for datasets and generate statistical reports. For example, the IBM data facilities storage management system (DFSMS) includes a section that analyzes actual data storage requirements for datasets and generates reports. Sterling Software and Boole & Babbage also offer programs to analyze usage patterns and generate reports. However, these prior art systems do not optimize JCL statements. The JCL programmer must review and understand the printed report and make appropriate revisions to the JCL statements for each job.

A somewhat different, but related problem arises from the need to manage the migration of datasets. For example, disk datasets are often periodically moved to tape for archival purposes. Tape datasets may be stored on-site for period of time and then purged or moved off-site for archival storage. Similarly, archival tape datasets are generally purged after some period of time. Many facilities handle this problem of dataset migration on an ad hoc basis or according to historical practices that may, or may not accurately reflect an optimal dataset migration strategy based on actual use patterns for each dataset or class of datasets.

3. Solution to the Problem

The present invention provides a system for monitoring actual data storage requirements for each dataset and automatically modifying JCL statements to include space allocations based on historical requirements for each dataset. This can be accomplished either by directly modifying the space allocation requests in such JCL statements or by replacing these JCL parameters with an appropriate DATACLAS parameter based on the historical space requirements of the dataset. The present invention can also be used to monitor actual use patterns for each dataset and automatically modify JCL statements to include an appropriate MGMTCLAS parameter governing dataset migration.

SUMMARY OF THE INVENTION

This invention provides a system for modifying job control language (JCL) statements to optimize data storage allocations for datasets. The system collects historical data concerning actual data storage space requirements and use patterns for each dataset. JCL statements are parsed to find references to datasets and their requested data storage space allocations. The system then generates revised JCL statements with revised space allocation requests and dataset migration information for each dataset based on historical space requirements and use patterns. Optionally, the system can display each proposed change to the JCL statements for approval by the user. The system can also revise JCL statements requesting allocation of space for each dataset in predetermined data storage areas grouped by predetermined size ranges.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 3(a) is an example of an input JCL statement defining a dataset stored on a disk drive or similar DASD.

FIG. 3(b) is an example of the resulting output JCL statement based on input JCL statement from FIG. 3(a).

FIG. 4(a) is an example of an input JCL statement defining a dataset stored on a tape.

FIG. 4(b) is an example of the resulting output JCL statement based on input JCL statement from FIG. 4(a).

FIG. 5 is a table showing the JCL parameters that are candidates for modification and the available options for each.

DETAILED DESCRIPTION OF THE INVENTION

Figure 1:
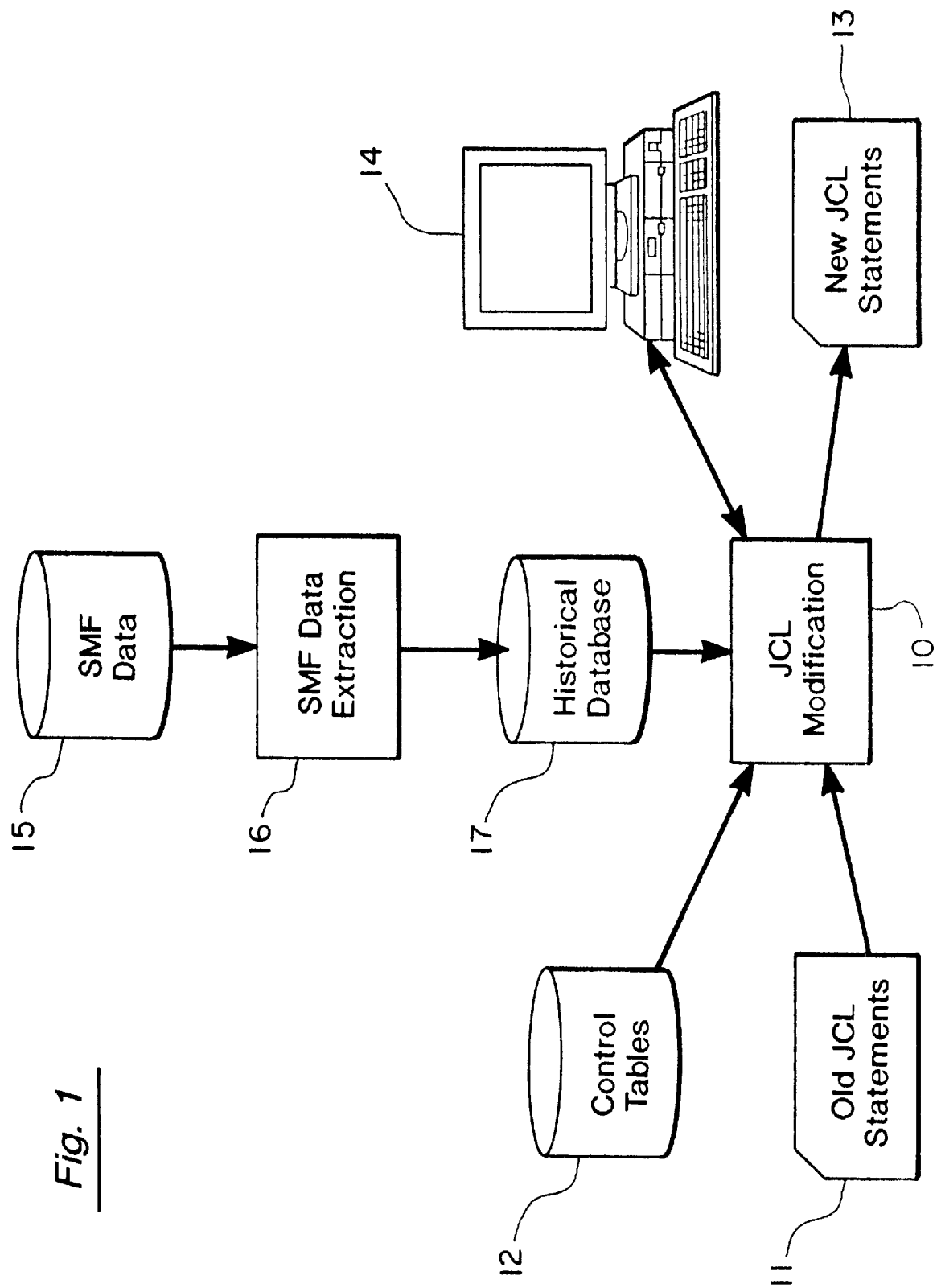
FIG. 1 is a schematic block diagram of the present system.

Turning to FIG. 1, a simplified block diagram is provided of the present system. As shown in this general overview, the system initially collects historical information on the actual space requirements and use pattern for each dataset by extracting this information from SMF (system management facility) data 15 maintained by the operating system. The SMF data extraction block 16 reads and filters SMF records 15 accumulated over a predetermined period of time to build an historical database 17 of the actual space requirements of each dataset. For example, the historical database 17 can include the average size, maximum size, and frequency of use for each dataset. The sample period can be of any length, and should be selected by the user to be fairly representative of normal usage patterns for datasets. This process can be repeated periodically to update the information in the historical database 17. The SMF data extraction block 16 also generates a report for the user summarizing the historical actual usage requirements for each dataset and providing statistics on the overall efficiency of space allocations.

During normal operation of the system, the JCL statements 11 for each job are read in and parsed to determine the fields and parameters for each JCL statement. Any JCL statements containing references to new datasets and requested data storage space allocations are passed to the JCL modification block 10. Other JCL statements are left unchanged.

The JCL modification block 10 is discussed below in detail and shown in FIG. 2. By way of an overview, the parameters of the data storage space allocation requests contained in the input JCL statements 11 are analyzed using substitution rules contained in the control tables 12. The JCL modification block 10 then generates new JCL statements 13 containing revised data storage space allocation requests and migration information for each dataset based on the substitution rules contained in the control table 12 and the historical data for each dataset from the historical database 17. The revised JCL statements 13 can be displayed 14 for the user to accept, reject, or otherwise edit. If the proposed revisions to the JCL statement are rejected by the user, the original JCL statement is used for the job. The system can also generate a report providing a complete audit trail documenting revisions to the JCL statements.

Figure 2:
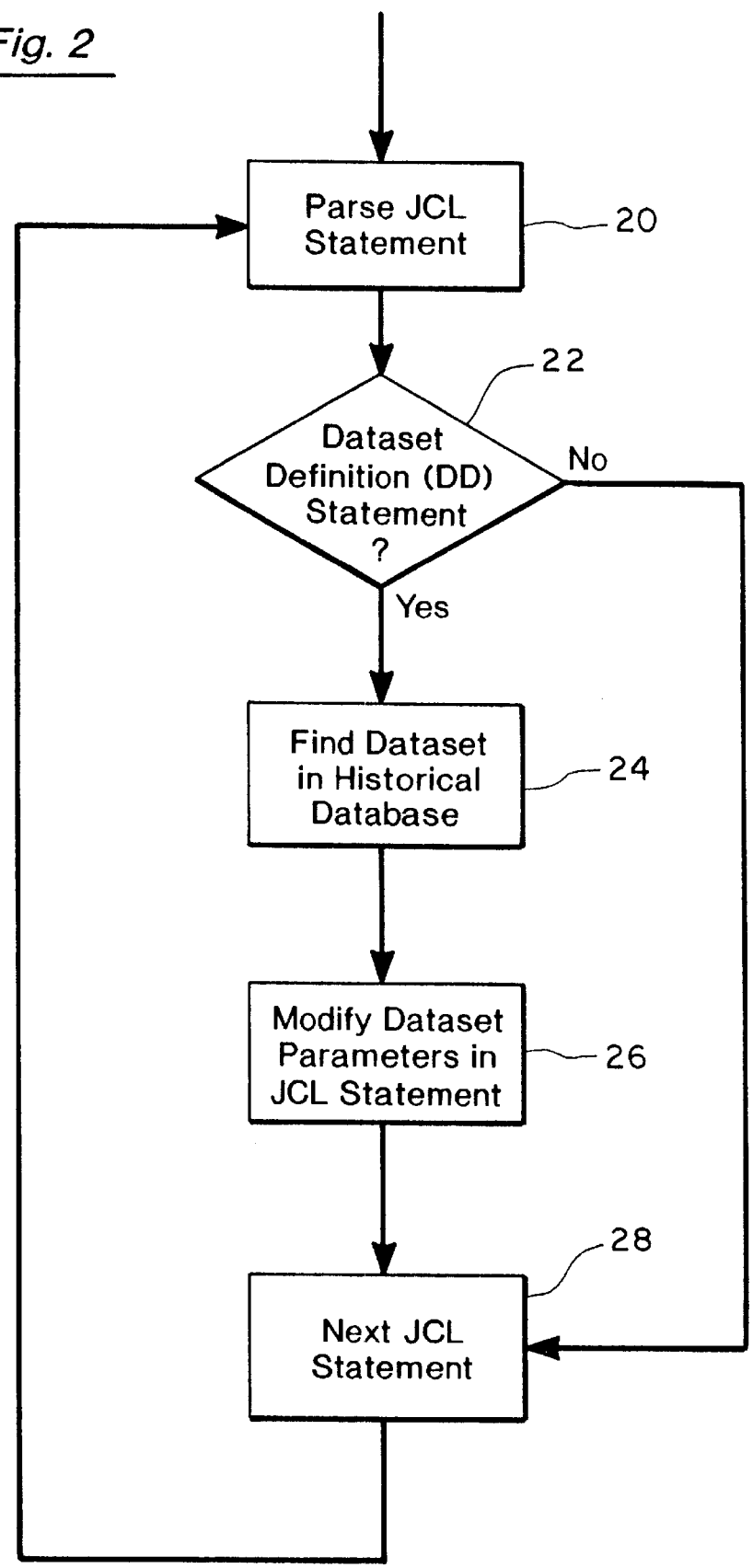
FIG. 2 is a simplified flow chart of the present invention.

FIG. 2 is a simplified flow chart of the JCL modification block 10 from FIG. 1. Each input JCL statement is parsed at step 20 into its respective fields and parameters. At step 22, the JCL statement is analyzed to determine whether it is a dataset definition statement ("//DDname DD . . . "). Other types of JCL statements (e.g., comment lines and EXEC statements) are passed without changes. At step 24, the historical database 17 is searched for an entry having the name of the dataset referenced in the dataset definition statement. If the dataset name is not found, the JCL statement is passed unchanged. On the other hand, if the dataset name is found, the JCL modification block modifies the dataset parameters in the JCL statement based on these historical statistics. The parameters that are candidates for modification are SPACE, AVGREC, STORCLAS, MGMTCLAS, and DATACLAS. The proposed changes to the JCL statement are shown on a display 14 for review by the user. The JCL modification block then proceeds to the next input JCL statement at step 28 until the end of the JCL statements is encountered.

FIGS. 3(*a*)–3(*b*) and 4(*a*)–4(*b*) provide two examples of JCL statements before and after they have been processed by the present system. In FIGS. 3(*a*) and 3(*b*), a JCL statement defining a disk dataset has been changed by deleting the SPACE parameter in the second line of the statement and substituting appropriate DATACLAS, STORCLAS, and MGMTCLAS parameters. Similarly, in FIGS. 4(*a*) and 4(*b*), a JCL statement defining a tape dataset has been changed by adding appropriate DATACLAS, STORCLAS, and MGMTCLAS parameters.

The system can be configured in any of a number of options governing the types of JCL modification that will be undertaken. FIG. 5 is a table showing the actions that the system will take on DD statement parameters depending on the processing option selected by the system administrator. The following is a summary of the available options shown in FIG. 5:

Dataclass Option. When the dataclass option is selected, the system adds the DATACLAS parameter to the DD statement with a dataclass name reflecting the true maximum space requirements for the dataset. The original SPACE, AVGREC, and DATACLAS parameters in the DD statement are removed. The actual maximum size of the dataset referenced in the DD statement are retrieved from the historical database 17. The system also includes a dataclass table containing a series of rows listing the various permissible dataclass names and their respective ranges of maximum size. In the interest of simplicity, the each dataclass name can be coded as a mnemonic indicating its size range. The system selects the appropriate row from the dataclass table based on the actual maximum size of the dataset referenced in the DD statement as retrieved from the historical database 17. The DATACLAS parameter is then added to the DD statement with the resulting dataclass name.

Group Option. When the Group option is selected, the system changes DD statement parameters to enable implementation of a special form of pooling, referred to as group allocation. Group allocation essentially eliminates space ABENDs and need for disk defragmentations. Its uniqueness is that, within a given pool, all space allocations (both primary and secondary) are in one given size (e.g., 10K). This option is applied only to DD statements defining permanent disk datasets with a disposition of NEW or MOD. The original SPACE, AVGREC, and DATACLAS parameters are removed from the DD statement.

The system includes a group table having a series of rows corresponding to a set of permissible dataclass names ranked by maximum dataset size. In the preferred embodiment of the present invention, the group table also includes an initial row for the minimum dataset size and a bottom row containing the maximum dataset size.

The actual maximum size of the dataset referenced in the DD statement is retrieved from the historical database 17 and used to select a row from the group table. If the historical maximum size of the dataset falls outside the bounds of the group table, a predetermined standard SPACE parameter can be added to the DD statement or the parameters from the original DD statement can be used. If the size of the dataset is within the bounds of a row in the group table, the DATACLAS parameter is set to that value and added to the DD statement.

Management Class Option. When the MGMTCLAS option is selected, the system uses the frequency of use data for the dataset from the historical database 17 to develop a management-class name coded to reflect the actual past usage pattern of the dataset. This option applies only to DD statements defining permanent disk datasets and permanent tape datasets having dispositions of NEW or MOD. Any existing MGMTCLAS parameter in the DD statement is removed.

The frequency of use data for the dataset is retrieved from the historical database 17 and analyzed to identify both short and long term usage patterns. In the preferred embodiment of the present invention, approximately 100 management-classes are supported. The management-class names generated by the system are mnemonic codes reflecting both the short and long term usage patterns. The codes for the short-term usage pattern are designed to support migration decisions for a multi-level storage hierarchy (e.g., primary, ML1, and ML2). The codes for the long-term usage pattern support decisions relative to automatic recall of datasets and disposition or location of ML2 media.

Pool Option. When the pool option is selected, the system adds a DATACLAS parameter to the DD statement reflecting the actual space required the dataset. The pool option may be selected with the tape-to-disk or management class options and is applied only to DD statements defining permanent disk datasets with a disposition of NEW or MOD. The original SPACE, AVGREC, and DATACLAS parameters in the DD statement are removed.

The actual maximum size of the dataset referenced in the DD statement is retrieved from the historical database 17. The system also includes a pool table containing a series of rows listing the various permissible dataclass names and their respective maximum sizes (e.g., small, medium, large, and huge). The system selects the appropriate row from the dataclass table based on the actual maximum size of the dataset referenced in the DD statement as retrieved from the historical database 17. The DATACLAS parameter is then added to the DD statement with the resulting dataclass name.

Remove Sortwork Option. When the Remove Sortwork option is selected, the system removes all DD statements defining SORTWORK datasets. A sort name table contains the names of various sort programs and a maximum sort size parameter for each sort program. The system examines the PGM parameter in each EXEC statement. If the program name matches a name entry in the sort name table, the maximum size of the input dataset for the step is retrieved from the historical database. If it is less than the maximum sort size specified in the sort name table, all DD statements defining SORTWORK datasets are deleted.

Space Recalculation Option. When the Space Recalculation option is selected, the system calculates new values for the SPACE parameter reflecting the actual space requirements of the dataset from the historical database 17. The new SPACE parameter and an appropriate AVGREC parameter are inserted into the DD statement in place of the original SPACE and AVGREC parameters. This option applies only to DD statements for permanent and temporary disk datasets having a disposition of NEW or MOD.

Tape To Disk Option. When the Tape To Disk option is selected, the system adds a DATACLAS parameter to the DD statement accurately reflecting the actual space requirements of the dataset based on statistics from the historical database 17. This option applies only to DD statements defining permanent tape datasets with a disposition of NEW or MOD.

The maximum size of the dataset defined in the DD statement is retrieved from the historical database 17. If the dataset is stored on a stacked tape, the maximum size of the stacked tape is also retrieved. A row is selected from the dataclass table for each size, and the appropriate DATACLAS is selected using the mnemonic naming convention described above. The DATACLAS parameter is added to the DD statement.

Temp Datasets Option. This option applies to DD statements defining temporary disk datasets with a disposition of NEW or MOD. The system adds the DATACLAS parameter to the DD statement with a dataclass name reflecting the true space requirements of the dataset based on statistics from the historical database 17. Here again, the dataclass name is selected from the dataclass table and the appropriate DATACLAS parameter is added to the DD statement using the mnemonic naming convention described above.

Replace Storageclass Option. The "Replace Storageclass" option determines how the STORCLAS parameter is processed in the Group, Pool, Dataclass, and Temp Datasets options. If it is set to "Yes", these options replace the STORCLAS parameter with the contents of their table entry. If the table entry is blank, the STORCLAS parameter is removed. If the option is set to "No", the STORCLAS parameter, if present, is transferred unchanged.

The above disclosure sets forth a number of embodiments of the present invention. Other arrangements or embodiments, not precisely set forth, could be practiced under the teachings of the present invention and as set forth in the following claims.

I claim:

1. A system for modifying job control language (JCL) statements to optimize data storage allocations for datasets comprising:

data collection means for collecting historical data concerning actual data storage space requirements of each dataset;

parsing means for parsing JCL statements for references to datasets and requested data storage space allocations; and means for generating revised JCL statements containing revised requests for data storage space allocations for said datasets based on said historical data.

2. The system of claim 1 further comprising means for displaying revisions to said JCL statement and allowing a user to accept or reject said revisions.

3. The system of claim 1 wherein said means for generating revised JCL statements generates revised JCL statements requesting allocation of data storage space for each dataset in predetermined data storage areas grouped by predetermined ranges of size.

4. The system of claim 1 further comprising means for generating a report providing an audit trail documenting revisions to said JCL statements.

5. The system of claim 1 wherein said historical data includes data on the frequency of use for each dataset, and wherein said means for generating revised JCL statements also generates JCL parameters concerning dataset migration based on said historical data.

6. The system of claim 1 wherein said historical data for each dataset includes maximum size.

7. The system of claim 1 wherein said data collection means collects historical data for each dataset from system management facility (SMF) records maintained by the computer operating system.

8. A system for modifying job control language (JCL) statements to optimize data storage allocations for datasets comprising:

data collection means for collecting historical data concerning actual data storage space requirements of each dataset;

parsing means for parsing JCL statements for references to datasets and requested data storage space allocations;

control tables containing a set of rules for substitution of parameters for data storage space allocation requests in JCL statements; and means for generating revised JCL statements containing revised data storage space allocation requests for said datasets based on said historical data and said rules in said control tables.

9. The system of claim 8 further comprising means for displaying revisions to said JCL statement and allowing a user to accept or reject said revisions.

10. The system of claim 8 further comprising means for generating a report providing an audit trail documenting revisions to said JCL statements.

11. The system of claim 8 wherein said historical data includes data on the frequency of use for each dataset, and wherein said means for generating revised JCL statements also generates JCL parameters concerning dataset migration based on said historical data.

12. The system of claim 8 wherein said historical data for each dataset includes maximum size.

13. The system of claim 8 wherein said control tables further comprises rules for conversion of said data storage space allocation request parameters into a predetermined DATACLAS parameter.

14. The system of claim 8 wherein said data collection means collects historical data for each dataset from system management facility (SMF) records maintained by the computer operating system.

15. The system of claim 8 wherein said means for generating revised JCL statements generates revised JCL statements requesting allocation of data storage space for each dataset in predetermined data storage areas grouped by predetermined ranges of size.

16. A system for modifying job control language (JCL) statements to optimize data storage allocations for datasets comprising:

data collection means for collecting historical data concerning actual data storage space requirements for each dataset from system management facility (SMF) records maintained by the computer operating system;

parsing means for parsing JCL statements for references to datasets and requested data storage space allocations;

control tables containing rules for substitution of parameters for data storage space allocation requests in JCL statements, including conversion of said data storage space allocation request parameters into a predetermined DATACLAS parameters based on said historical data; and means for generating a revised JCL statements containing a revised data storage space allocation requests for said datasets using said DATACLAS parameters.

17. The system of claim 16 further comprising means for displaying revisions to said JCL statement and allowing a user to accept or reject said revisions.

18. The system of claim 16 further comprising means for generating a report providing an audit trail documenting revisions to said JCL statements.

19. The system of claim 16 wherein said historical data collected by said data collection means includes data on the frequency of use for each dataset; wherein said control tables further contain rules for selecting a MGMTCLAS parameter based on said frequency of use data; and wherein said means for generating revised JCL statements also generates said MGMTCLAS parameter.

20. The system of claim 16 wherein said means for generating revised JCL statements generates revised JCL statements requesting allocation of data storage space for each dataset in predetermined data storage areas grouped by predetermined ranges of size.

* * * * *